POINT CONTACT SEMICONDUCTIVE DEVICE

Filed Aug. 26, 1952

INVENTORS
JACOB W. STINEMAN JR.
SAMUEL A. ROBINSON
BY
Allen V. Hazeltine
ATTORNEY 2,751,529
Patented June 19, 1956

2,751,529

POINT CONTACT SEMICONDUCTIVE DEVICE

Jacob W. Stineman, Jr., Villanova, and Samuel A. Robinson, Lansdale, Pa., assignors to Philco Corporation, Philadelphia, Pa., a corporation of Pennsylvania Application August 26, 1952, Serial No. 306,446

12 Claims. (Cl. 317—236)

Our invention relates to point-contacted semiconductor devices, and to methods for the manufacture thereof. More particularly it relates to novel constructions and methods of manufacture for improving the general stability of low-noise crystal rectifiers.

The invention will be described with particular reference to point-contact crystal rectifiers such as may be used as mixers in microwave receivers, although it will be understood that the invention is also applicable to certain other related devices of similar structure, such as the transistor for example. A typical low-noise crystal rectifier to which the present invention is applicable, is shown and described in the copending application No. 291,858 of P. L. Ostapkovich for an Electrical System, filed June 5, 1952, and of common assignee with the present invention.

As is set forth in that application, an important criterion of electrical performance for such a rectifier is the noise figure thereof, commonly defined as equal to the product of the conversion loss and the noise temperature of the device used as a mixer. This noise figure is an inverse measure of the useful sensitivity of a receiver utilizing the crystal rectifier in an early stage thereof, for example in the mixer stage of an ordinary superheterodyne microwave receiver. As is well known, the lower is the noise figure of the crystal, the greater is the usable range of reception of the receiver in which it is used.

Another important criterion of performance for such semiconductor devices is the general stability thereof, a term which, as used hereinafter, includes both the resistance of the device to mechanical shock and vibration, and its resistance to certain other degenerative environment influences such as contaminated atmosphere and excessive moisture, for examples.

However, the requirements of low noise figures and high stability have heretofore generally been considered antithetical. For example, as set forth in the above-mentioned copending application, we have found that a crystal rectifier of particularly low and consistent noise figure may suitably comprise an extremely fine, pointed filamentary electrode, or whisker, composed of titanium and bearing gently upon a surface of specially prepared germanium, through which whisker an appropriate forming current has been passed while in contact with the germanium surface. A typical diameter for the titanium whisker is 0.00175 inch, while the point of contact with the germanium may be only about 0.0002 inch in diameter for example. In accordance with practices of the prior art, the semiconductor and the whisker may be mounted within a cylindrical ceramic casing, and the casing filled with a soft wax in order to exclude contaminated air and moisture from the region of the contact between whisker and crystal surface.

However, although a crystal rectifier constructed in this manner will be characterized by a particularly low noise figure, it will not possess the requisite degree of stability for certain applications. When subjected to shock tests, and often even in the process of construction and routine handling of the device, slight movements of the whisker on the surface of the semiconductor may readily occur, with the result that the whisker may lose contact with the tiny area through which the forming current has been passed, and the electrical performance of the rectifier may thereby be seriously impaired.

Among the salient characteristics of such low-noise crystal rectifiers which render them particularly susceptible to shock are the very light pressure exerted upon the semiconductor surface by the extremely fine whisker, the very small area of the point of contact between the whisker and the semiconductor surface, and the weak adherence of the whisker to the surface. The latter characteristic is due, at least in part, to the fact that germanium and titanium exhibit but a slight tendency to bond or weld to each other in response to the forming current passed through their junction. With such a crystal structure, the presence of the wax-like filler, conventionally used to protect the contact point from deleterious environmental influences, only serves to augment the sensitivity of the device to shock, because of the tendency of the wax-like material to flow when subjected to severe accelerations, and therefore to move the extremely fine whisker.

Accordingly, it is an object of our invention to provide a point-contacted semiconductor device having substantially improved mechanical and electrical properties.

Another object is to provide such a device which is capable of retaining its low-noise characteristics despite severe mechanical shocks.

Still another object is to provide such a semiconductor device capable of retaining its low-noise properties and mechanical stability for long periods of time, even under adverse environmental conditions of contaminated atmosphere or excessive humidity.

A still further object of the invention is to provide a point-contacted semiconductor device comprising a semiconductive material and a fine filamentary electrode lightly engaging a surface thereof, which device is characterized by a low noise figure but which is nevertheless of high stability and reliability.

It is still another object to provide a novel method of constructing such improved devices.

In accordance with our invention, the above objects are achieved by fixing the position of the fine filamentary electrode or whisker upon the crystalline semiconductor surface by means of a tiny globule of a cement which forms strong bonds with metals and semiconductors, and which preferably possesses low shrinkage during curing and aging and a low temperature coefficient of expansion. In a preferred embodiment, the material of the globule is a resinous cement chosen from the group comprising the epoxy and ethoxyline resins. This minuscule globule of cement may be applied to the point of contact between whisker and crystal surface by means of a fine filament which may be of glass, preferably after a forming current has been passed through the contact point. A force is then applied to the cement, acting toward the crystal surface at the contact point. To accomplish this, the entire semiconductor assembly is preferably subjected to centrifuge action, in such manner that the centrifugal force produced acts in a direction normal to, and toward, the crystal surface at the point of contact with the whisker, the centrifuging being continued until the resinous cement has set. This centrifuging causes the tiny globule of resinous cement to modify its previous substantially spherical surface form, to tend to flatten itself against the whisker and the crystal surface, and preferably to assume a concave surface shape substantially completely below the wider end of the sharpened region of the whisker.

Globules of this concave surface shape, produced by centrifuging, have been found to minimize the production of unbalanced forces, particularly laterally directed forces, which may otherwise arise because of shrinkage or expansion of the cement material. Due to the great bonding strength of this type of resinous cement, the position of the whisker upon the semi-conductor surface is rigidly fixed by the hardened globule, and, because of the small initial size of the globule of cement and the concave surface structure of the globule produced by the centrifuging operation, the position and pressure of the whisker are maintained substantially invariant despite large variations in ambient temperature.

In accordance with the invention, the size of the globule of resinous cement added to the contact point is preferably equivalent in volume to that of a spherical bead which is about two thousandths of an inch in diameter, and in any event less than substantially four thousandths of an inch in diameter. If the volume of the globule is increased appreciably beyond this limit, thermal expansion of the resinous cement will generally result in undesired motion of the minute point of contact, and severe impairment of the electrical properties of the rectifier.

In our construction, we have also eliminated the wax-like filler conventionally employed in the interior of crystal rectifier cartridges, not only to do away with the stresses which may be produced upon the whisker by flowing of the wax-like material under severe acceleration, but also to prevent the wax-like material from causing deterioration or expansion of the small globule of cement holding the whisker to the semiconductor surface. To isolate this globule from environmental influences with the wax filler removed, in our construction the crystal cartridge is preferably filled with a dry, clean gaseous substance such as air, and then sealed hermetically. As described hereinafter in detail, the sealing arrangement is such that volatile components of the sealing compounds given off during hardening cannot reach and contaminate the whisker-bonding globule.

Thus, by our construction and method of fabrication, there is provided a point-contacted low-noise semiconductor device which is electrically stable when subjected to mechanical shock and to adverse environmental conditions, and is therefore adapted for use not only in commercial apparatus but also in military equipment wherein the stability and reliability requirements are generally more stringent.

Other objects and features of the invention will become more apparent from a consideration of the following detailed description taken together with the accompanying drawings, in which.

Figure 1:
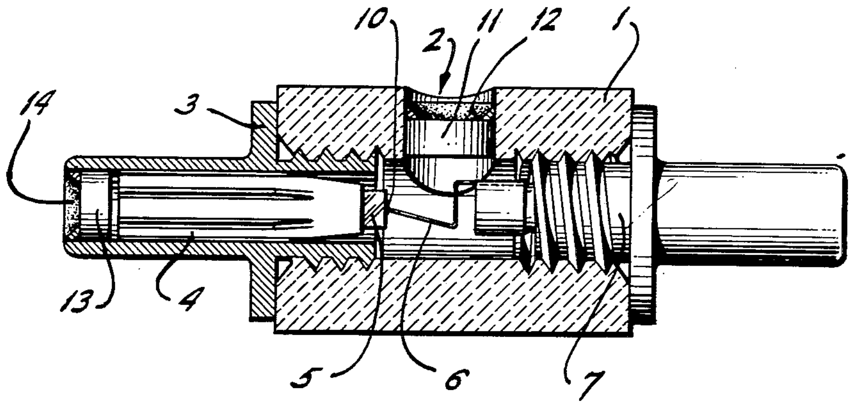
Figure 1 is a sectional view of a point-contact crystal rectifier cartridge embodying the invention.
Figure 2:
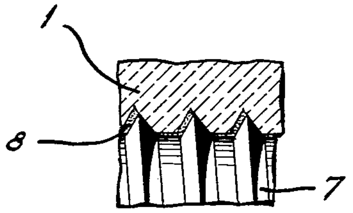
Figure 2 is a fragmentary sectional view showing the manner in which certain threaded inserts are cemented in place in the cartridge of Figure 1.

Referring now to Figure 1 in detail, the crystal rectifier cartridge assembly represented therein is of the symmetrical, coaxial type, suitable for use as a rectifier or mixer in the conversion of radio-frequency signals of approximately 10,000 megacycles per second, to intermediate frequency signals of approximately 30 megacycles per second, for example. This cartridge may comprise an insulating cartridge case 1 in the form of a hollow ceramic cylinder threaded internally at each end, and having a circular opening 2 through one wall thereof. Into one end of cartridge case 1 there may be inserted threaded plug member 3, which is hollow so as to accomodate a crystal-bearing splined rod member 4 press-fitted into it. The crystal member 5 may be soldered to rod 4, and is point-contacted by means of a whisker 6 composed of titanium, welded or otherwise fastened to a whisker-bearing plug member 7 threaded into the opposite end of cartridge case 1. As is shown clearly in the fragmentary view of Figure 2, wherein like parts are designated by like numerals, plug members 3 and 7 are fixed rigidly in position by means of a suitable cement 8, such as the phenolic resin known as basing cement, or by shellac, which also provides an airtight seal along the threads.

The crystal member 5 is preferably composed principally of nearly pure germanium together with appropriate impurities in small quantities for providing the desired electrical properties. We have found that, in a preferred embodiment of the invention, the germanium is approximately 99.78% pure, and is alloyed with a primary impurity of antimony dispersed substantially uniformly therethrough in the amount 0.2% by weight, and a secondary impurity of bismuth in the amount of 0.02% by weight. Although the germanium content is preferably substantially pure, the 99.78% of germanium may also include an appreciable amount of insignificant impurities, such as silicon and carbon for example, which do not act to any substantial degree as either acceptors or donors of electrons in the crystal lattice. In some instances, the amounts of these insignificant impurties may be as great as 0.78% by weight. However, with regard to significant impurities other than the antimony and bismuth in the amounts specified, the amount of such impurities is preferably maintained below 0.01%.

At the point of contact between whisker 6 and crystal member 5, there is disposed a tiny globule 10 of a cement which bonds strongly with the metal of the whisker and the semiconductive material of the crystal member, and which also preferably possesses a relatively low coefficient of thermal expansion together with low shrinkage during curing and aging. In the preferred embodiment, this cement is a resinous composition selected from the group comprising the epoxy and ethoxyline resins.

As has been indicated hereinbefore, the small size of globule 10 is of the essence of the invention in one aspect thereof. If the volume of the globule is greater than that of a spherical bead having a diameter of substantially 4 thousandths of an inch, the rectifier will usually fail or deteriorate substantially in a performance a short time after fabrication, particularly during thermal tests. Preferably, the globule 10 has a volume equal to that of a spherical bead about two thousandths of an inch in diameter and, as described hereinafter in detail, may suitably be formed by applying such a bead to the point of contact between whisker 6 and crystal 5 and centrifuging the assembly during setting of the cement in the manner described later herein.

We believe that the failure of rectifiers, using globules larger than those specified above, results from microscopic motion of the extremely fine whisker upon the crystal surface, occasioned by contraction or expansion of the material of the globule either during curing and aging or during temperature cycling of the rectifier between its required operating temperature limits. Only when the size of globule 10 is of the order of magnitude specified herein, will such motion of the whisker become negligible, the whisker remain upon the portion of the crystal through which the forming current has been passed, and the quality of the electrical performance of the rectifier be retained.

The stated classes of resins preferably employed in globule 10 are well-known, commercially available, synthetic resins. The epoxy resins are basically condensation products of a polyhydric alcohol, such as bisphenol-A or glycerol, and epichlorhydrin. Such condensation products are thermoplastic but are convertible to the solid, insoluble, infusible state by cross-linking with an amine catalyst, usually a diamine. An example of a commercial epoxy resin is Hysol 6020 manufactured by Houghton Laboratories. This material is crystalline at room temperature, and a curing catalyst in liquid form may be added thereto just prior to utilization. Other examples of commercial epoxy resins are the Epon Resins manufactured by the Shell Chemical Corporation. The ethoxyline resins are closely related to the epoxy resins in chemical structure and properties. Examples of commercial ethoxyline resins are the Araldites manufactured by Ciba Company, Incorporated, such as Araldite AN–101 and AN–102 which are liquid at room temperature and can be converted to the solid infusible, insoluble state at room temperatures. The stated resins are available in other forms which may be employed in accordance with the invention, although some may require the application of heat to produce proper and rapid curing.

The whisker 6, although represented as relatively thick in Figure 1 for convenience in representation, is preferably an exceedingly fine filament of titanium, which may be in the form of a wire of circular cross-section having a diameter of 0.00175 inch, and which has been sharpened to an extremely fine point at the end which makes contact with the crystal surface. Because of the light pressure with which the whisker bears against the crystal surface, this sharp point is blunted only very slightly by its contact with the surface. A small area of contact, having a diameter of about two ten-thousandths of an inch, is therefore provided. This small contact area contributes to the characteristically low noise figure of our rectifier, but renders the whisker readily movable in response to shock and vibration in the absence of the provisions of our invention.

Figure 3:
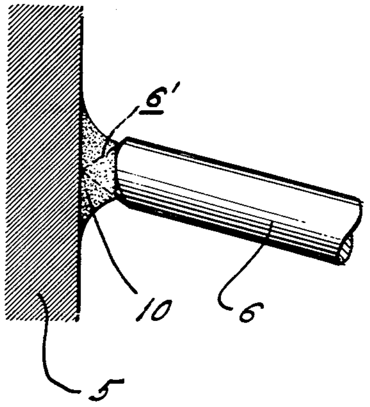
Figure 3 is a fragmentary view, partly in section, showing in detail a portion of the cartridge of Figure 1 in the vicinity of the point-contact.

The nature of the bond between whisker 6 and crystal member 5 is shown in more detail in Figure 3, wherein like numerals denote like parts. The tiny globule of resinous cement 10 is preferably disposed evenly and substantially symmetrically about the point of contact between the whisker 6 and the crystal member 5, so that it contacts only the crystal member 5 and a small sharpened portion 6′ of the whisker 6. The outer surface of the globule 10 is preferably concave, so that any residual forces exerted by the thermal contraction or expansion of the globule are principally in a direction normal to the crystal surface, and lateral motion of the whisker point upon the surface is exceedingly unlikely to occur.

The interior space within ceramic case 1 and between plug members 3 and 7, may contain a dry, clean gas such as air or argon, and is sealed from the exterior by the following means. As indicated hereinbefore with reference to Figure 2, the threaded portions of plug members 3 and 7 are sealed with a suitable cement, which may be a phenolic resin with an amino-acid catalyst, such as basing cement, or orange shellac, so as to prevent the passage of air along the threads thereof. Opening 2, which is provided to permit the addition of the globule 10, is sealed by means of a resilient cylindrical plug 11 which fits tightly into opening 2. Preferably, this plug is of neoprene, although cork or rubber may also be used for this purpose. To provide further sealing, a suitable sealing compound 12, such as the above-mentioned basing cement, may be placed around the periphery of the external surface of plug 11 to seal completely the crevice between the plug and cartridge case 1.

A similar construction may be utilized to seal the space between the splined rod member 4 and the interior surface of plug member 3. Thus there may be employed a neoprene plug 13 forced into the interior of plug member 3, the junction of plug 13 with plug member 3 being additionally sealed by means of a suitable sealing compound 14 placed around the perimeter of the plug 13 at the exterior surface thereof. Preferably, plug 13 is inserted in such manner as to leave a small space between it and the rod member 4, so as to eliminate the chance of motion of crystal member 5 in response to forces fortuitously applied to plug 13.

Figure 4:
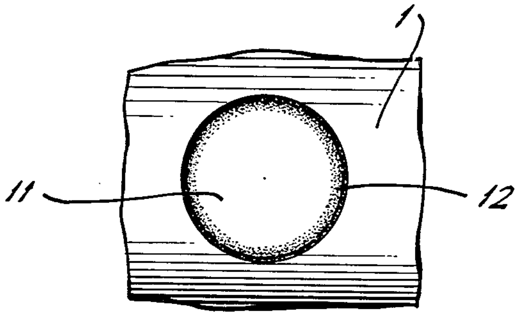
Figure 4 is a fragmentary plan view showing in detail the nature of the arrangement used to seal the opening in the side of the cartridge of Figure 1.

The nature of this sealing arrangement is shown in more detail in Figure 4, wherein like numerals designate like parts. In that figure there are shown the circular opening in cartridge case 1 into which the neoprene plug 11 is forced, and the sealing compound 12 joining the plug with the case 1 along the perimeter of the outer surface of the plug.

With this method of sealing, any volatile materials which may be given off by the sealing compounds 12 and 14 during setting and hardening will be unable to penetrate, to any substantial degree, into the interior of case 1 and to the point of contact between whisker 6 and crystal 5, thus avoiding any degeneration or expansion of globule 10 which might be caused by such volatile products.

A method of manufacturing the complete crystal assembly in accordance with the invention will now be described.

The body of semiconductive material, in a preferred embodiment comprising germanium with appropriate impurities, is produced by reducing germanium oxide to provide relatively pure germanium. This germanium may then be further purified by melting it, progressively cooling it so as to concentrate undesired impurities in the ends thereof, and then selecting the central purified portion of the germanium for subsequent use. This purified germanium may then be placed into a crucible designed for vertical ingot production by placement within a radiant heating device suitably arranged to provide an appropriate temperature gradient through the germanium material. The germanium is melted by means of heat from the above-mentioned radiant heaters, and then caused to solidify progressively and slowly, under carefully controlled conditions, so as to obtain a relatively large ingot of germanium which is single-crystalline. However, before cooling and solidification, and preferably before melting, the primary and secondary impurities, comprising antimony and bismuth in the amounts hereinbefore indicated for the preferred embodiment, are added to the germanium. The single-crystalline ingot produced therefore comprises an alloy of germanium, antimony and bismuth, in accordance with the percentages indicated hereinbefore. This ingot may be generally cylindrical in form, and may commonly have a length of two to three centimeters, for example.

The crystal ingot may then be cut into appropriate small slabs by means of a diamond cutting wheel, soldered to the rod member 4 of Figure 1, and provided with a suitable high polish.

The whisker 6, appropriately cut, pointed, crimped and thoroughly cleaned, may be welded or soldered to threaded plug member 7. A suitable cement, such as the above-mentioned phenolic basing cement, may then be applied to the threads of plug member 7, after which it is screwed into one end of the ceramic case. The hollow plug member 3 may be similarly assembled into the opposite end of the cartridge case.

The crystal-bearing rod member 4 may then be forced through hollow plug member 3 until contact is made with the whisker, and then advanced two thousandths of an inch. A gradually-applied, D.-C. forming current having a maximum value of approximately 0.15 ampere may be passed through the contact between whisker and crystal in the direction of greater conductivity, until the desired voltage-current characteristic is obtained, which generally requires about five to ten seconds.

The next step in accordance with the invention is to provide the tiny globule 10 of an appropriate cement at the point of contact between the whisker 6 and the crystal member 5. To accomplish this, a fine filament, having a diameter of the order of one thousandth of an inch, may be employed as an applicator, to which has been transferred an exceedingly small bead of the cement in liquid form. Glass is the preferred material for the filament, although hair or a metal filament may also be used. This filament, holding the tiny bead of cement, may be held in an appropriate mechanical manipulator within the field of view of a binocular microscope, and so manipulated as to deposit the globule of cement as near as possible to the contact point between whisker and crystal. Preferably, the globule is deposited so as to contact both whisker and crystal, without jarring the whisker by direct contact with the glass filament. The use of the exceedingly fine filament of glass described above permits the handling of a sufficiently tiny globule of cement, and renders less serious any accidental jarring contact between rectifier whisker and applicator filament which might occur in depositing the globule. The entire crystal cartridge assembly is then placed within a centrifuge with the longitudinal axis of symmetry of the cartridge case disposed radially in the centrifuge, and with the whisker 6 nearer the axis of rotation than crystal member 5, so that spinning of the centrifuge results in the exertion of a centrifugal force upon globule 10 tending to move it in the direction of the surface of crystal member 5. This centrifuging operation is continued until the cement of globule 10 has set, preferably while subjected to infra-red heating, an operation which may require a period of the order of three or four hours, for example.

Allowing the cement to set while under the influence of the centrifugal force described above, causes the hardened globule to depart from its previous substantially spherical form, and to possess the concave form shown in Figure 3. This depression of the surface of the globule improves greatly the stability of the bond between whisker and crystal when subjected to thermal changes, as indicated hereinbefore.

When globule 10 has completely cured and aged, the chamber within the ceramic case 1, and surrounding the contact point between whisker and crystal, may be flushed with a suitably dry, clean gas such as air or argon, and the resilient plugs 11 and 13 inserted into the openings in case 1 and in plug member 3, respectively. The sealing cements 12 and 14 may then be applied by any suitable means to close any remaining air passage between the plugs and the walls of the chambers into which they are inserted.

As a result of the bonding of the whisker to the semiconductor by means of the tiny globule of cement which has set while subjected to centrifugal force, and as a result of the cementing of the threaded plug members 3 and 7 into the cartridge case, the final assembly is highly stable when subjected to mechanical shock or vibration. Longevity of the device is assured by surrounding the contact point with a harmless gas, retained by means of the sealing arrangements described hereinbefore.

Although the invention has been described with reference to a particular embodiment thereof, it will be appreciated that it is not limited to such specific forms, but is susceptible of embodiment in any of a wide variety of other forms without departing from the spirit of the invention, as will occur to one skilled in the art.

We claim:

1. In a shock-resistant point-contact semiconductor device having low-noise properties, a semiconductive material, a fine filamentary electrode of diameter less than about 2 mils bearing lightly upon said semiconductive material and forming a rectifying contact point therewith, and a minuscule globule of cement positioned about said point and rigidly bonding said electrode to said semiconductive material, the volume of said globule being less than that of a sphere having a diameter of 0.004 inch.

2. The device of claim 1, in which said globule has a volume equal to that of a sphere having a diameter substantially equal to two thousandths of an inch.

3. The device of claim 1, in which said cement is characterized by low shrinkage during curing and aging thereof, by a low temperature coefficient of expansion, and by the property of forming strong bonds between metals and semiconductors.

4. The device of claim 1, in which said cement is selected from the group comprising the epoxy and the ethoxyline resins.

5. A crystal rectifier of low noise figure and high stability comprising a hollow insulating case, a crystal support member mounted to said case, a semiconductive crystal mounted upon said support member within said case, a fine filamentary electrode bearing gently upon a surface of said crystal at a contact point within said case, a second support member mounted to said case and supporting said electrode, a tiny globule of cement surrounding said point of contact and having a volume less than that of a sphere of diameter equal to four thousandths of an inch, and means sealing said point of contact from the exterior of said case.

6. The method of constructing a stable point-contacted semiconductor device comprising an assembly of a filamentary electrode in contact with the surface of a semiconductive material, said method comprising the steps of applying a tiny globule of cement having a volume less than that of a sphere of diameter of about 0.004 inch to the vicinity of said contact, causing said cement to set, and centrifuging said assembly to provide a centrifugal force upon said cement in the direction of said surface during said setting operation.

7. The method of claim 6, in which said force is applied to said cement at least for a time equal to that required for said cement to set.

8. The method of claim 6, comprising in addition the step of passing an electric current through said contact prior to said application of said cement.

9. The method of fabricating a crystal rectifying device comprising the steps of cementing a crystal-bearing plug and a whisker-bearing plug into an insulating casing so that said whisker contacts said crystal, applying a tiny globule of cement to the point of contact between said whisker and said crystal by way of an opening in said casing, centrifuging the assembly thus formed during the setting period of said last-named cement so as to impel said cement in the direction of said crystal surface, flushing the interior of said casing with a clean, dry gaseous substance, inserting a resilient plug into said opening, and applying a sealing cement to the periphery of the external surface of said plug.

10. In a shock-resistant point-contact semiconductor device having low-noise properties, a semiconductive material, a fine filamentary electrode bearing lightly upon said semiconductive material and forming a rectifying contact point therewith, and a minuscule globule of cement positioned about said point and rigidly bonding said electrode to said semiconductive material, the volume of said globule being less than that of a sphere having a diameter of substantially 0.004 inch, said globule possessing a concave surface joining said material and said electrode.

11. In a shock-resistant point-contact semiconductor device having low-noise properties, a semiconductive material comprising germanium with a primary impurity of antimony and a secondary impurity of bismuth, a fine filamentary electrode composed of titanium bearing lightly upon said semiconductive material and forming a rectifying contact point therewith, and a minuscule globule of cement positioned about said point and rigidly bonding said electrode to said semiconductive material, the volume of said globule being less than that of a sphere having a diameter of 0.004 inch.

12. In a shock-resistant point-contact semiconductor device having low-noise properties, a semiconductive material, a fine filamentary electrode having a sharpened portion in contact with, and bearing lightly upon, said semiconductive material and forming a rectifying contact point therewith, and a minuscule globule of cement positioned about said point, contacting said material and substantially only said sharpened portion of said electrode, and rigidly bonding said electrode to said semiconductive material, the volume of said globule being less than that of a sphere having a diameter of about 0.004 inch.

References Cited in the file of this patent

UNITED STATES PATENTS

| | | |
|---|---|---|
| 2,406,405 | Salisbury | Aug. 27, 1946 |
| 2,475,940 | Britain | July 12, 1949 |
| 2,572,801 | Casellini | Oct. 23, 1951 |
| 2,588,956 | Brittain et al. | Mar. 11, 1952 |
| 2,612,567 | Stuetzer | Sept. 30, 1952 |
| 2,639,380 | Hollman | May 19, 1953 |